(12) United States Patent
Kato

(10) Patent No.: US 6,354,277 B1
(45) Date of Patent: Mar. 12, 2002

(54) CONTROL FOR ENGINE UNDER TRANSITIONAL CONDITION

(75) Inventor: Masahiko Kato, Hamamatsu (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/282,389

(22) Filed: Mar. 31, 1999

(30) Foreign Application Priority Data

Mar. 31, 1998 (JP) .......................................... 10-086276

(51) Int. Cl.⁷ .............................................. F02M 51/00
(52) U.S. Cl. ...................................... 123/492; 123/357
(58) Field of Search .............................. 123/370, 357, 123/492, 493, 494, 478, 73 A, 305

(56) References Cited

U.S. PATENT DOCUMENTS

| | | | |
|---|---|---|---|
| 4,987,888 A | * | 1/1991 | Funabashi et al. ..... 123/406.46 |
| 5,081,975 A | | 1/1992 | Maebashi |
| 5,083,543 A | * | 1/1992 | Harada et al. ............... 123/492 |
| 5,092,287 A | * | 3/1992 | Motoyama et al. ....... 123/73 A |
| 5,105,792 A | | 4/1992 | Ichikawa et al. |
| 5,140,964 A | * | 8/1992 | Torigai ........................ 123/492 |
| 5,184,589 A | | 2/1993 | Nonaka |
| 5,205,254 A | | 4/1993 | Ito et al. |
| 5,215,068 A | | 6/1993 | Kato |
| 5,241,939 A | * | 9/1993 | Nonaka ....................... 123/492 |
| 5,261,376 A | | 11/1993 | Kato et al. |
| 5,269,243 A | | 12/1993 | Mochizuki |
| 5,322,044 A | | 6/1994 | Maebashi |
| 5,387,163 A | | 2/1995 | Sakamoto et al. |
| 5,448,974 A | | 9/1995 | Toda |
| 5,450,828 A | | 9/1995 | Sakamoto et al. |
| 5,476,426 A | | 12/1995 | Nakamura et al. |
| 5,549,092 A | * | 8/1996 | Hasegawa et al. .......... 123/478 |
| 5,626,120 A | | 5/1997 | Akatsuka |
| 5,690,063 A | | 11/1997 | Motoyama et al. |
| 5,715,793 A | | 2/1998 | Motose |
| 5,899,192 A | * | 5/1999 | Tsutsumi et al. ........... 123/492 |
| 5,937,825 A | | 8/1999 | Motose |
| 6,016,794 A | * | 1/2000 | Hashimoto et al. ......... 123/675 |
| 6,035,825 A | * | 3/2000 | Worth et al. ................. 123/357 |
| 6,062,179 A | | 5/2000 | Gohara et al. |
| 6,220,904 B1 | | 4/2001 | Hoshiba et al. |

* cited by examiner

Primary Examiner—Carl S. Miller
(74) Attorney, Agent, or Firm—Knobbe, Martens, Olson & Bear, LLP

(57) ABSTRACT

A control device and method of injected fuel for a direct cylinder injected, internal combustion engine. The control device primarily increases the fuel amount to a certain amount under the conditions that the engine load is increasing such as an acceleration condition. The device, however, when a quick change of the load increase occurs, reduces the increase amount of the fuel at the first combustion cycle or cycles. Although there may be other controls, the device then gradually increases the fuel amount to the amount until the primary amount at intervals of at least one combustion cycle. The quick change of the load increase is, in one aspect of the invention, defined as that a crankshaft rotational speed is within a predetermined range and the throttle valve opening is larger than a predetermined value.

38 Claims, 9 Drawing Sheets

CONTROL FOR ENGINE UNDER TRANSITIONAL CONDITION

BACKGROUND OF THE INVENTION

1. Field of the Invention

This invention relates to a control for an engine under a transitional condition and more particularly to an improved control device and method for a direct injected internal combustion engine under a transitional condition such as a quick acceleration.

2. Description of Related Art

In the interest of improving engine performance and particularly fuel efficiency and exhaust emission control, many types of engines now employ a fuel injection system for supplying fuel to the engine. In this system, generally fuel is injected into an air induction device. This fuel injection has the advantages of permitting the amount of fuel delivered for each cycle of the engine to be adjusted. In addition, by utilizing the fuel injection system, it is possible to maintain the desired fuel air ratio under a wide variety of engine running condition. In order to obtain still further improvements, a direct fuel injection system is being considered. This system injects fuel directly into the combustion chamber and thus has significant potential advantages rather than the indirect fuel injection noted above.

These features are particularly useful with two cycle engines, although not specifically limited thereto. Because the overlap between the scavenge port and exhaust port opening and closing give rise to the possibility that unburned hydrocarbons may pass into the atmosphere through the exhaust port. In addition, amounts of exhaust gases remaining in the combustion chamber relatively under light speeds and loads can cause misfiring and eventually unburned hydrocarbons again pass through the atmosphere.

In operation, a control device for the injection systems increases the amount of fuel that is supplied to the fuel injector under the transitional conditions, that the engine load is increasing. Such transitional conditions include an acceleration of the engine speed. The larger the rate of the increase of the load is, the larger amount of fuel the engine requires. This situation is, for example, a quick acceleration of the engine speed.

Meanwhile, the injected fuel needs certain time for diffusion. If the fuel is injected in the air induction device, it has enough time for diffusion before entering into the combustion chamber. However, in the direct cylinder injection, the fuel has relatively meager time for diffusion and this can result in incomplete combustion. This incomplete combustion is likely to give the operator uneasy feeling such as a slow rate of acceleration.

The problem is prominent, for instance, in two stroke engines wherein an ignition timing comes almost immediately after the end of the injection timing. Even in four stroke engines under a full or almost full speed operation as is typical in marine engines such as outboard motors that are usually operated under high load conditions, ignition occurs shortly after the completion of injection. This is because this running condition requires a relatively long duration of injection. In short, these engines under such conditions may fire the fuel air charge before completion of the fuel diffusion and hence can invite the aforenoted problem.

In addition, the two cycle engine operates on a crankcase compression principle. Air charge is induced into the crankcase chamber first and then transferred to the combustion chamber through scavenge passages. Because of this, in the transitional period, there is a large discrepancy between the engine requirement and an actual amount of the induced air.

Usually, under a quick acceleration condition, an amount of the air charge entering into the combustion chamber from the crankcase chamber in the transitional period will not be consistent with a required amount until one or two combustion cycles elapse. In other words, an actual air charge amount deviates from a required amount during these one or two combustion cycles.

This state is shown in FIG. 1 that illustrates an interrelationship between the number of combustion cycles and the amount of induced air charge per combustion cycle. As seen in this figure, the actual amount of the induction air charge that is $Q_2$ at the first instance of the transitional period Tr reaches the amount of the engine requirement $Q_1$ and only becomes stable at the third combustion cycle. The deviation results in an incorrect fuel air ratio and eventually difficulties in control of emissions discharged from the exhaust ports. It should be noted that the transitional period Tr in FIG. 1 does not coincide with the transitional condition such as an acceleration condition. The transitional condition is longer than the transitional period. The relationship shown in FIG. 1 will be described more in detail with the description of the control routine shown in FIG. 6.

It is, therefore, a principal object of this invention to provide a direct injection control system that can improve combustion states under the transitional conditions in which the engine load is increasing not to give the operator uneasy feeling and also to remove difficulty in control of emissions.

SUMMARY OF THE INVENTION

This invention is adapted to be embodied in a direct cylinder, internal combustion engine.

In accordance with one aspect of this invention, the engine has an engine body that defines at least one cylinder bore in which a piston reciprocates to rotate a crankshaft. A cylinder head is affixed to one end of the engine body for closing the cylinder bore and defining with the piston and the cylinder bore a combustion chamber. An air induction device that has a throttle valve is provided for admitting an air charge to the combustion chamber. A fuel injector is provided for spraying fuel directly into the combustion chamber for combustion therein. Means for sensing rotational speeds of the crankshaft is provided. Means for sensing openings of the throttle valve is provided. A control device is provided for increasing the fuel amount in response to the output from the throttle valve openings sensing means when the output becomes larger than before. The control device further reduces the increase amount of the fuel when the output from the crankshaft rotational speeds sensing means is within a predetermined range and the output from the throttle valve openings sensing means is larger than a predetermined value.

In accordance with another aspect of this invention, the engine has an engine body that defines at least one cylinder bore in which a piston reciprocates. A cylinder head is affixed to one end of the engine body for closing the cylinder bore and defining with the piston and the cylinder bore a combustion chamber. An air induction device is provided for admitting an air charge to the combustion chamber. A fuel injector is provided for spraying fuel directly into the combustion chamber for combustion therein. Means for sensing amounts of the air charge is provided. Means for controlling amounts of the fuel is provided. The fuel amounts control means primarily increases the fuel amount in response to the output from the air charge amounts sensing means when the air charge amount required by said engine is increasing. The fuel amounts control means further reduces the increase amount of the fuel in response to the output from the air charge amounts sensing means when the difference between the air charge amount required by the engine and the actual air charge amount is larger than a predetermined value.

In accordance with a method for practicing this invention with the engine that comprises an engine body defining at least one cylinder bore in which a piston reciprocates to rotate a crankshaft, a cylinder head affixed to one end of said engine body for closing the cylinder bore and defining with the piston and the cylinder bore a combustion chamber, an air induction device having a throttle valve for admitting an air charge to the combustion chamber, a fuel injector for spraying fuel directly into the combustion chamber for combustion therein, the method has the step of sensing the opening of the throttle valve. A step of increasing the fuel amount is provided when the opening is larger than before. A step of sensing the rotational speed of the crankshaft and reducing the increase amount of the fuel is provided when the rotational speed is within a predetermined range and the opening is larger than a predetermined value.

Further aspects, features and advantages of this invention will become apparent from the detailed description of the preferred embodiments which follow.

BRIEF DESCRIPTION OF THE DRAWINGS

As noted above.

DETAILED DESCRIPTION OF THE PREFERRED EMBODIMENTS OF THE INVENTION

The general overall environment in which the invention is practiced and certain details of the engines will be described primarily by reference to FIG. 2 and additionally to FIGS. 3, 4 and 5.

Figure 2:
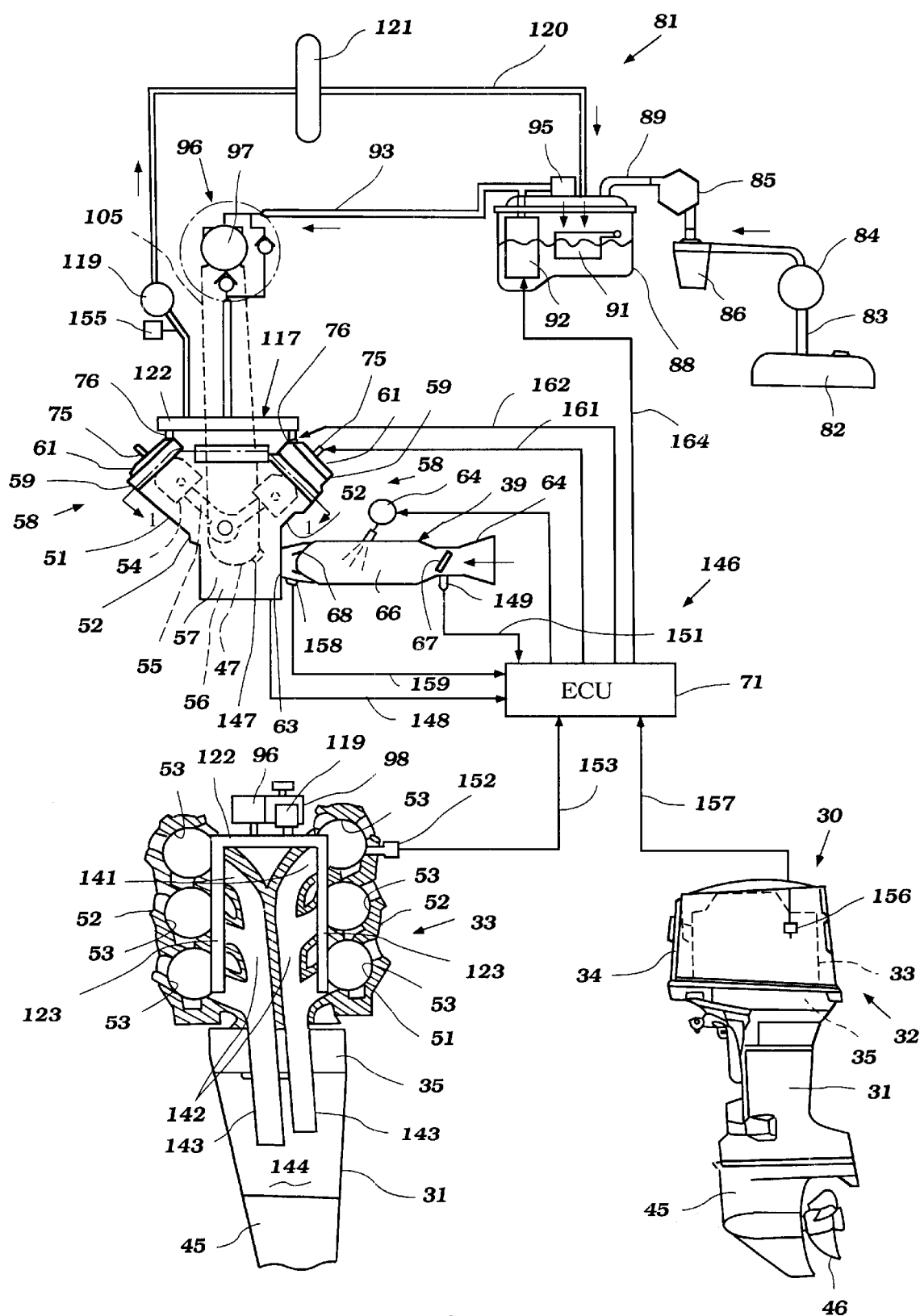
FIG. 2 is a multi-part view showing: in the lower right-hand portion, an outboard motor embodying the inventions; in the upper view, a partially schematic view of the engine of the outboard motor with its induction and fuel injection system shown in part schematically; in the lower left-hand portion, a rear elevational view of the outboard motor with portions removed and other portions broken away and shown in section along the line 1—1 in the upper view so as to more clearly show the construction of the engine; and fuel injection system shown in part schematically. An ECU (Electric Control Unit) for the motor links the three views together.

In the lower-right hand view of the FIG. 2, an outboard motor constructed and operated in accordance with an embodiment of the invention is depicted in side elevational view and is identified generally by the reference numeral 30.

The entire outboard motor 30 is not depicted in that the swivel bracket and clamping bracket that are associated with the driveshaft housing, indicated generally by the reference numeral 31, are not illustrated. This is because these components are well known in the art and the specific method by which the outboard motor 30 is mounted to the transom of an associated watercraft is not necessary to permit those skilled in the art to understand or practice the invention.

The outboard motor 30 includes a power head, indicated generally by the reference numeral 32, that is positioned above the driveshaft housing 31 and which includes a powering internal combustion engine, indicated generally by the reference numeral 33. This engine 33 is shown in more detail in the remaining two view of this figure and will be described shortly by reference thereto.

The power head 32 is completed by a protective cowling which includes a main cowling member 34. This main cowling member 34 is detachably connected to an exhaust guide 35 which is a lower tray portion of the protective cowling 32 and encircles an upper portion of the driveshaft housing 31. The main cowling member 34 has a pair of compartments 36 (see FIGS. 3 and 5: one compartment is omitted) placed at rear and both sides of its body. The compartments 36 open rearwardly so that air is introduced into these compartments 36 as indicated by the arrow 37. Air inlet barrels 38, which have no bottom portion, stand in the respective compartments 36. The air inlet barrel 38 looks like a funnel and the compartment 36 is connected with interior of the cowling 34 through the air inlet barrel 38. Thus the air is admitted into interior of the cowling 34 from the compartments 36 and then goes to an air induction system, indicated generally by the reference numeral 39, which will be described later in detail, as indicated by the arrows 41 and 42.

Positioned beneath the driveshaft housing 31 is a lower unit 45 in which a propeller 46, which forms the propulsion device for the associated watercraft, is journaled.

As is typical with outboard motor practice, the engine 33 is supported in the power head 32 so that its crankshaft 47 (see the upper view) rotates about a vertically extending axis. This is done so as to facilitate connection of the connection of the crankshaft 47 to a driveshaft (not shown) which depends into the driveshaft housing 31 and which drives the propeller 46 through a conventional forward, neutral, reverse transmission contained in the lower unit 45.

The details of the construction of the outboard motor and the components which are not illustrated may by considered to be conventional or of any type known to those wishing to utilize the invention disclosed herein. Those skilled in the art can readily refer to any known constructions with which to practice the invention.

Referring now in detail to the construction of the engine 33 still by primary reference to FIG. 2, in the illustrated embodiment, the engine 33 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Some features of the invention, however, have particular utility in connection with V-type engines.

Also, although the engine 33 will be described as operating on a two stroke principle, it will also be apparent to those skilled in the art that certain facets of the invention can be employed in conjunction with four stroke engines. In fact, some features of the invention also can be employed with rotary type engines.

The engine 33 is comprised of a cylinder block 51 that is formed with a pair of cylinder banks 52. Each of these cylinder banks 52 is formed with three vertically spaced, horizontally extending cylinder bores 53. Pistons 54 reciprocate in these cylinder bores 53. The pistons 54 are, in turn, connected to the upper or small ends of connecting rods 55. The big ends of these connecting rods are journaled on the throws of the crankshaft 47 in a manner that is well known in this art.

The crankshaft 47 is journaled in a suitable manner for rotation within a crankcase chamber 56 that is formed in part by a crankcase member 57 that is affixed to the cylinder block 51 in a suitable manner. As is typical with two stroke engines, the crankshaft 47 and crankcase chamber 56 are formed with seals so that each section of the crankcase that is associated with one of the cylinder bores 53 will be sealed from the others. This type of construction is well known in the art.

A cylinder head assembly, indicated generally by the reference numeral 58, is affixed to the end of the cylinder banks 52 that are spaced from the crankcase chamber 56. These cylinder head assemblies 58 are comprised of a main cylinder head member 59 that defines a plurality of recesses (not shown) in its lower face. Each of these recesses corporate with the respective cylinder bore 53 and the head of the piston 54 to define the combustion chambers of the engine. This is also well known in the art. A cylinder head cover member 61 completes the cylinder head assembly 58. The cylinder head members 59 and 51 are affixed to each other and to the respective cylinder banks 52 in a suitable, known manner.

The air induction system 39 is provided for delivering an air charge to the sections of the crankcase chamber 56 associated with each of the cylinder bores 53. This communication is via an intake port 63 formed in the crankcase member 57 and registering with each such crankcase chamber section.

The induction system 39 includes an air silencing and inlet device, shown schematically in this figure and indicated by the reference numeral 64. The actual construction of this air charge device appears in FIGS. 3 and 5. In actual physical location, this device 64 is contained within the cowling 34 at the forward end thereof and has a rearwardly facing air inlet opening 65 through which air is introduced.

The air inlet device 64 supplies the induced air to a plurality of throttle bodies or induction devices 66, each of which has a throttle valve 67 provided therein. These throttle valves 57 are supported on throttle valve shafts (not shown). These throttle valve shafts are linked to each other for simultaneous opening and closing of the throttle valves 57 in a manner that is well known in this art.

As is also typical in two cycle engine practice, the intake ports 63 have, provided in them, reed-type check valves 68.

These check valves 68 permit the air to flow into the sections of the crankcase chamber 56 when the pistons 54 are moving upwardly in their respective cylinder bores. However, as the pistons 54 move downwardly, the charge will be compressed in the sections of the crankcase chamber 56. At that time, the reed type check valve 68 will close so as to permit the charge to be compressed. In addition, lubricant pumps 69 are provided for spraying lubricant into the throttle bodies 66 for engine lubrication under the control of an ECU (Electronic Control Unit) 71 that will be described more in detail later. Although it is not shown, some forms of direct lubrication may be also employed for delivering lubricant directly to certain components of the engine.

The charge which is compressed in the sections of the crankcase chamber 56 is then transferred to the combustion chambers as through a scavenging system (not shown) in a manner that is well known. A spark plug 75 is mounted in the cylinder head assembly 58 for each cylinder bore. The spark plug 75 is fired under the control of the ECU 71.

The spark plug 75 fire a fuel air charge that is formed by mixing fuel directly with the intake air via a fuel injector 76. The fuel injectors 76 are solenoid type and electrically operated also under the control of the ECU 71. The fuel injectors 76 are mounted directly in the cylinder head 59 in a specific location, as will be described, so as to provide optimum fuel vaporization or diffusion under all running conditions.

Fuel is supplied to the fuel injectors 76 by a fuel supply system, indicated generally by the reference numeral 81 (see the upper and lower left hand views of FIG. 2). The fuel supply system 81 composes a main fuel supply tank 82 that is provided in the hull of the watercraft with which the outboard motor 30 is associated. Fuel is drawn from this tank 82 through a conduit 83 by means of a first low pressure pump 84 and a plurality of second low pressure pumps 85. The first low pressure pump 84 is a manually operated pump and the second low pressure pumps 85 are diaphragm type pumps operated by variations in pressure in the sections of the crankcase chamber 56, and thus provide a relatively low pressure.

A quick disconnect coupling (not shown) is provided in the conduit 83 and also a fuel filter 86 is positioned in the conduit 83 at an appropriate location.

From the low pressure pump 85, fuel is supplied to a vapor separator 88 which is mounted on the engine 33 or within the cowling 34 at an appropriate location. This fuel is supplied through a line 89. At the vapor separator end of the line 89, there is provided at a float valve (not shown) that is operated by a float 91 so as to maintain a uniform level of fuel in the vapor separator 88.

A high pressure electric fuel pump 92 is provided in the vapor separator 88 and pressurizes fuel that is delivered through a fuel supply line 93 to a high pressure pumping apparatus, indicated generally by the reference numeral 94. The electric fuel pump 92, which is driven by an electric motor, develops a pressure such as 3 to 10 $kg/cm^2$. A low pressure regulator 95 is positioned in the line 93 at the vapor separator 88 and limits the pressure that is delivered to the high pressure pumping apparatus, indicated generally by the reference numeral 96 by dumping the fuel back to the vapor separator 88.

The high pressure fuel delivery system 96 includes a high pressure fuel pump 97 that can develop a pressure of, for example, 50 to 100 $kg/cm^2$ or more. A pump drive unit 98 (the lower left hand view) is provided for driving the high pressure fuel pump 97.

Figure 3:
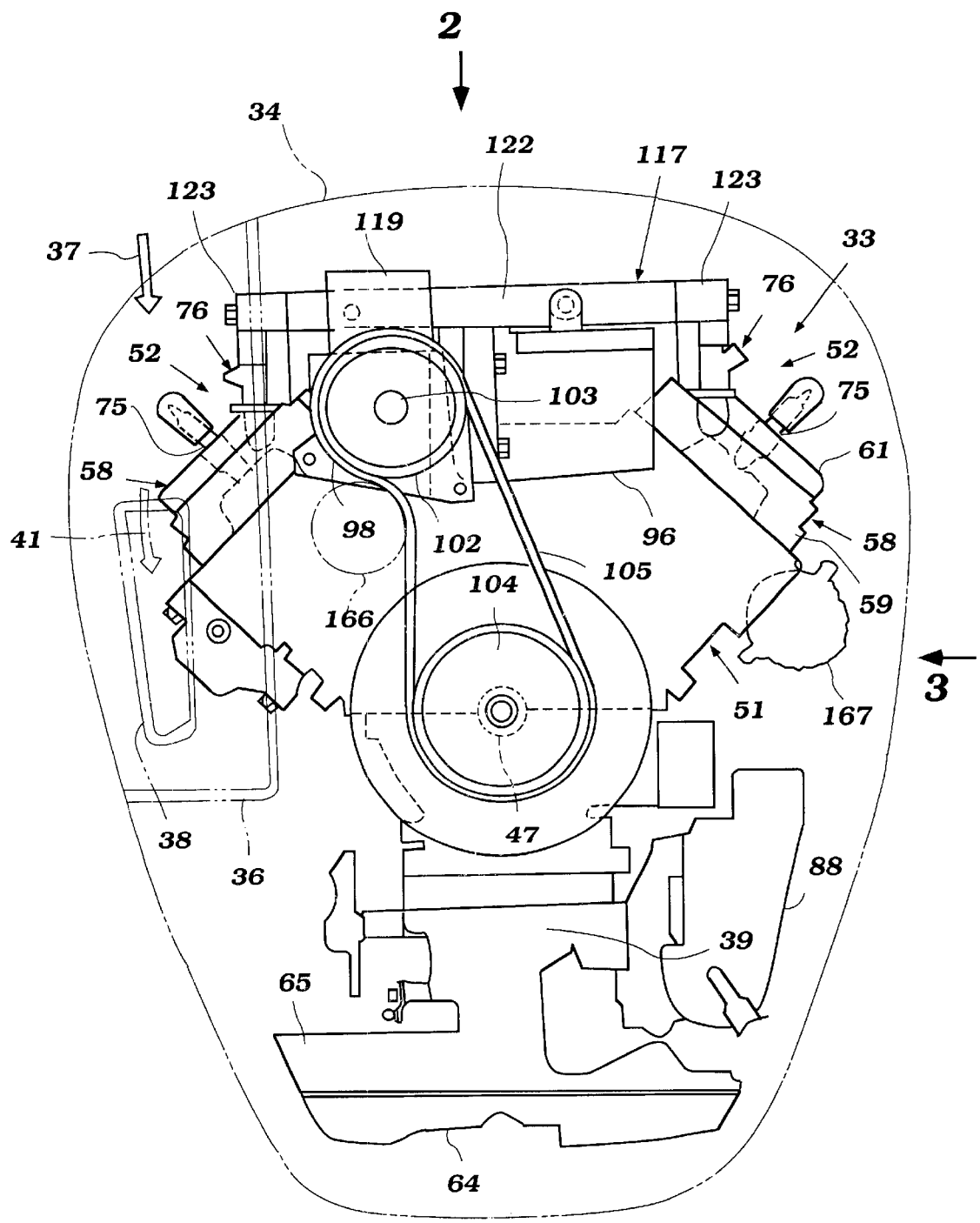
FIG. 3 is a top plan view of the power head showing the engine in solid lines and the protective cowling in phantom.
Figure 4:
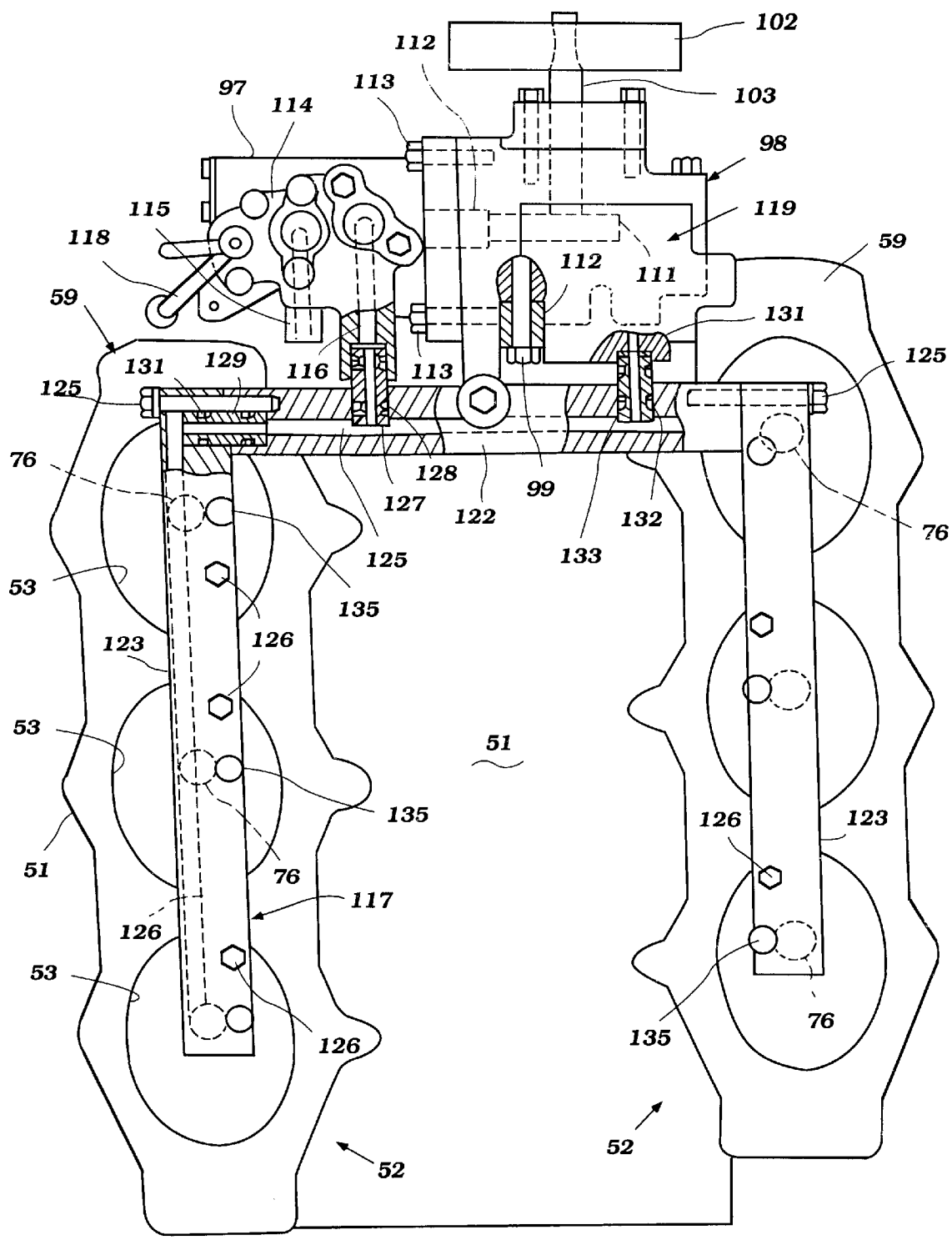
FIG. 4 is a rear elevational view of the engine showing partly in cross-section and is taken generally in the direction of 2 in FIG. 2
Figure 5:
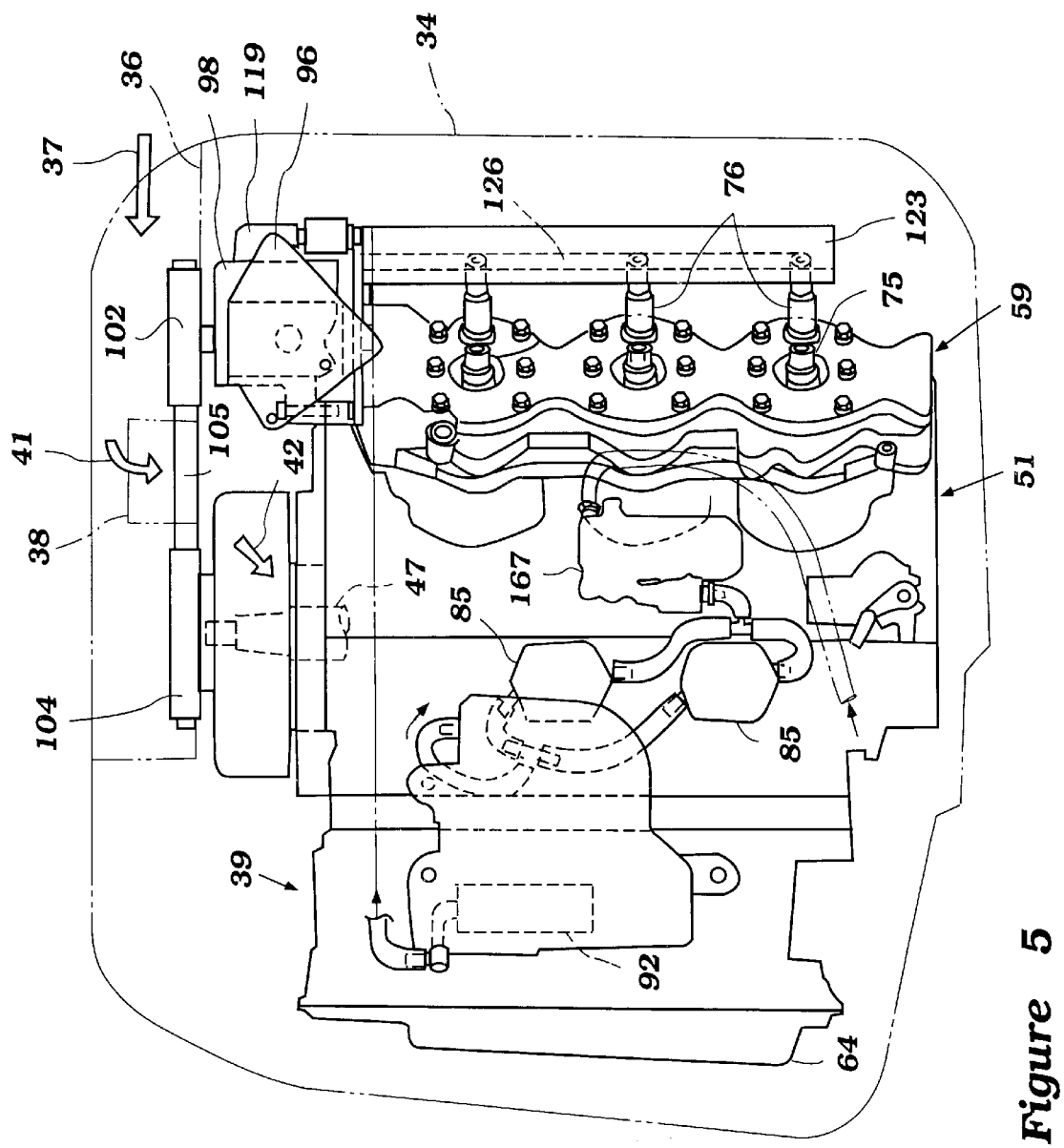
FIG. 5 is a side elevational view of the power head showing the engine in solid lines and the protective cowling in phantom, and is taken in the direction of the arrow 3 in FIG. 2.

Referring to FIGS. 3 and 4, the pump drive unit 98 is partly affixed to the cylinder body 51 via a stay 112 with bolts 99 and partly directly affixed to the cylinder body 51 so as to overhang between the two banks 52 of the V arrangement. A pulley 102 is affixed to a pump drive shaft 103 of the pump drive unit 98. The pulley 102 is driven from a driving pulley 104 affixed to the crankshaft 47 by means of a drive belt 105.

The pump drive shaft 103 is provided with a cam disc 11 existing horizontally for pushing plungers 112 which are disposed on the high pressure fuel pump 97.

Figure 1:
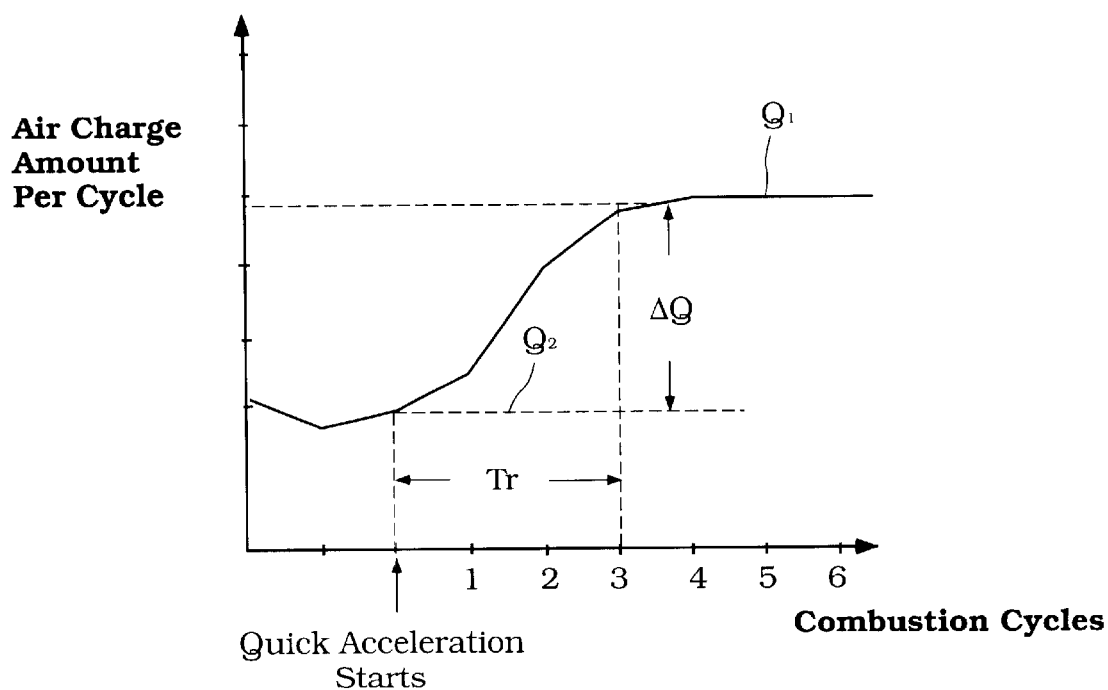
FIG. 1 illustrates relationships between the number of combustion cycles and the amount of induced air charge per combustion cycle.

The high pressure fuel pump 97 is mounted on the pump drive unit 98 with bolts 113. The high pressure fuel pump 97 has a unified fuel inlet and outlet module 114 which is mounted on a side wall of the pressure pump 97. The inlet and outlet module 114 has an inlet passage 115 connected with the line 93 (FIG. 1), an outlet passage 116 connected with a fuel supply conduit 117 and an overflow passage 118 connected with the vapor separator 88 (FIG. 1). The line for returning the overflow fuel to the vapor separator 88 is omitted in FIG. 1.

The pressure of the fuel supplied by the fuel pump 97 is regulated to be the fixed value by a high pressure regulator 120 which dumps fuel back to the vapor separator 88 through a pressure relief line 109 in which a fuel heat exchanger or cooler 121 is provided. It is important to keep the fuel under the constant pressure. Because the fuel amounts are determined by changes of duration of injection under the condition that the pressure for injection is always the same.

Fuel is supplied from the high pressure fuel pump 97 to the fuel supply conduit 117. The fuel supply conduit 117 is comprised of a main fuel manifold 122 that extends horizontally. The main fuel manifold 122, in turn, delivers fuel to a pair of vertically extending fuel rails 123. The fuel rails 123 deliver fuel to the fuel injectors 76.

The fuel rails 123 are affixed to the main manifold 122 with bolts 125. Also, the respective fuel rails 123 are affixed to both of the cylinder heads 59 with bolts 126. Thus, the fuel supply conduit 117 is mounted on the engine 33 by means of the pump drive unit 98 via the stay 112, partly directly, at the cylinder body 51 and by means of fuel rails 123 at the cylinder head 59.

The main manifold 122 and the fuel rails 123 are hollow tubes and the hollows therein form fuel passages 125 and 126. The fuel passage 125 in the main manifold 122 and the fuel passages 126 in both of the fuel rails are connected to each other. The outlet passage 116 of the fuel inlet and outlet module 114 is connected to the fuel passage 125 of the main manifold 122 with a connector 127 around which is sealed with O-shaped elastic (rubber) rings 128. The main manifold 122 and the fuel rails 123, in turn, are connected together with connectors 129 around which are sealed with the same O-shaped elastic rings 131 also.

The pressure regulator 119 is also mounted on the pump drive unit 98 with bolts (not shown). The pressure regulator 119 has a passage 13 therein that forms a part of the pressure relief line 120 (FIG. 1) and this passage 131 is connected to the fuel passage 125 in the main manifold 122 with a connector 132 around which is also sealed with an O-shaped elastic ring 133. The fuel injectors 76 are affixed between the fuel rails 123 and the cylinder head member 59 with bolts 135.

Returning back to FIG. 2, after the fuel charge has been formed in the combustion chambers by the injection of fuel from the fuel injectors 76, the charge is fired by firing the spark plugs 75. The injection timing and duration, as well as the control for the timing of firing of the spark plugs 75, are controlled by the ECU 71.

Once the charge burns and expands, the pistons 54 will be driven downwardly in the cylinder bores until the pistons 54 reach the lowermost position. At this time, an exhaust port (not shown) will be uncovered so as to open the communication with an exhaust passage 141 (see the lower left-hand view) formed in the cylinder block 51. The exhaust gases flow through the exhaust passages 141 to manifold collector sections 142 of respective exhaust manifolds that are formed within the cylinder block 51. These exhaust manifold collector sections 142 communicate with exhaust passages formed in an exhaust guide plate 35 on which the engine 33 is mounted.

A pair of exhaust pipes 143 depends from the exhaust guide plate 35 and extend the exhaust passages 141 into an expansion chamber 144 formed in the driveshaft housing 31. From this expansion chamber 144, the exhaust gases are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

A feedback control system, indicated generally by the reference numeral 146 is provided for realizing a control strategy along which the beginning and duration of fuel injection from the injector 76 and timing of firing of the spark plug 75 are controlled. The control strategy under the transitional condition in which the engine load is increasing will be described in detail later with reference to FIG. 6 and again FIG. 1.

The feedback control system 146 comprises the ECU 71 as a control unit or device and a number of sensors which sense either engine running conditions, ambient conditions or conditions of the outboard motor 30 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the duration of fuel injection.

There is provided, associated with the crankshaft 47, a crankshaft angle position sensor 147 which, when measuring crankshaft angle versus time, outputs a crankshaft rotational speed signal or engine speed signal indicated schematically at 148 to the ECU 71.

Operator demand or engine load, as determined by throttle angle of the throttle valve 67, is sensed by a throttle position sensor 149 which outputs a throttle position or load signal 151 to the ECU 71. When the operator desires to gather speed, i.e., accelerate the engine speed, a throttle on a steering handle (not shown) is operated by the operator. The throttle valve 67 is, then, going to open toward the certain open position that corresponds to the desired speed at which air charge is induced more than before into the crankcase chamber 56 through the throttle bodies 66. Also, the engine load increases, for example, when the associated watercraft advances against wind. In this situation, the operator also operates the throttle so as to recover the speed that is lost.

A quick operation of the throttle by the operator means a desire of quick recovery of the speed under a sudden increase of the engine load or a quick speed up, i.e., quick acceleration. This quick change, however, is likely to cause the problems noted in the background description rather than a slow change. Thus, the quick acceleration and quick increase of engine load are the conditions that need a particular control which will be described more in detail later.

A combustion condition or oxygen sensor 152 is provided that senses the in cylinder combustion conditions by sensing the residual amount of oxygen in the combustion products at a time near the time when the exhaust port is opened. This output and air fuel ratio signal are indicted schematically at 153 to the ECU 71.

There is also provided a pressure sensor 155 in line connected to the pressure regulator 119. This pressure sensor 155 outputs the high pressure fuel signal to the ECU 71 (its signal line is omitted in FIG. 2).

There also may be provided a water temperature sensor 156 (see the lower right-hand view) which outputs a cooling water temperature signal 157 to the ECU 71.

Further, an intake air temperature sensor 158 (see the upper view) is provided and this sensor 158 outputs an intake air temperature signal 159 to the ECU 71.

Although these are all sensors shown in FIG. 2, it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 71, as has been noted, outputs signals to the fuel injectors 76, spark plugs 75, the lubrication pumps 69 and the high pressure electric fuel pump 92 for their respective control. These control signals are indicated schematically in FIG. 1 at 161, 162, 163 and 164, respectively.

In addition, a starter motor 166 for starting the engine 33 and a tensioner 167 for giving tension to the belt 105 are provided (see FIG. 3).

Referring now to primarily FIG. 6 and additionally to FIG. 1, a preferred control routine will be described.

Figure 6:
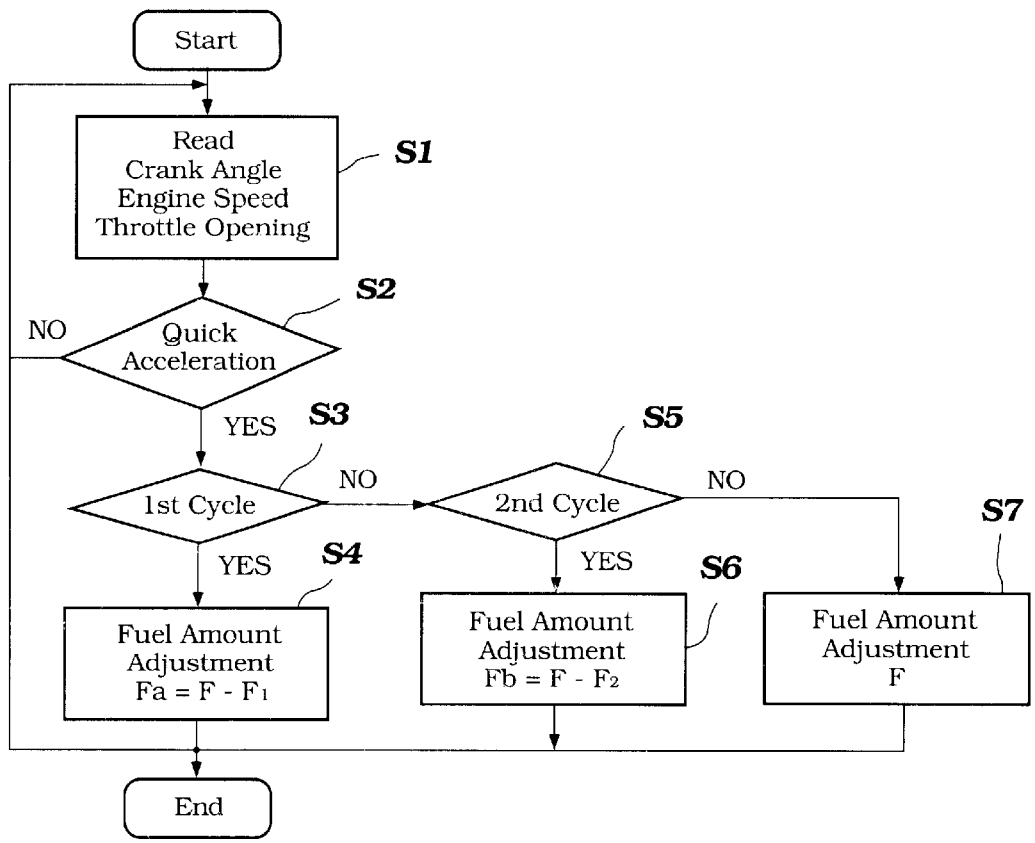
FIG. 6 is a schematic view showing how the ECU operates a control routine in accordance with a feature of the invention.

FIG. 6 illustrates a flow chart showing how the ECU 71 operates a control routine in accordance with a feature of this invention. In this routine, a quick acceleration is controlled as an example. It should be noted, however, that a quick increase of engine load can be also controlled under the same control routine and the same control conditions. Thus, the acceleration means the increase of engine load as well as the acceleration per se hereunder.

Before describing the control routine in FIG. 6, the concept of control will be described with reference to FIG. 1. FIG. 1, as depicted in the background description, illustrates a graphical view showing the number of combustion cycles versus the amount of induced air charge per combustion cycle. Under a condition of acceleration, as seen in this figure, the engine requires the increased amount of air charge $Q_1$. However, the actual amount of the air charge at the first instance is $Q_2$ and then gradually approaches to the required amount $Q_1$ every combustion cycles ($Q_2$ represents the actual air charge amount in this description). The transitional period Tr shown in FIG. 1 contains three combustion cycles. There is a certain difference $\Delta Q$ between the required air charge amount $Q_1$ and the actual air charge amount $Q_2$. The larger the difference $\Delta Q$ ($\Delta Q=Q_1-Q_2$), the longer the time before reaching the stable condition. If this difference $\Delta Q$ is large, then it means a quick acceleration.

In a conventional system, a control unit controls to supply the increased fuel amount as corresponding to the required air charge amount $Q_1$. However, it is apparent that the increased fuel amount is too much for the actual air charge amount $Q_2$. Thus, the mismatch of the fuel amount with the air charge amount occurs and then results in the incorrect fuel air ratio.

In order to adjust the difference $\Delta Q$ in this transitional period Tr, however, the program in this embodiment reduces the respective injection amounts at the first and second combustion cycles and then at the third combustion cycle the injection amount is returned to the primary amount that the engine needs for operation under an acceleration condition. It should be noted that the acceleration condition still continues for a while after the actual air charge amount has reached the required amount $Q_1$.

Turning to FIG. 6, in accordance with the concept, the program of the ECU 71 starts and then moves to the step S1 to read a crankshaft rotational speed (engine speed), as well as the crankshaft angle, and a throttle opening. As described above, the crankshaft angle and the crankshaft rotational speed are sensed by the crankshaft angle position sensor 147 and the throttle opening is sensed by the throttle position sensor 149.

Next the program goes to the step S2 to determine if it is a quick acceleration. In this regard, the accurate definition of this quick acceleration is given as that the difference $\Delta Q$ shown in FIG. 1 is larger than a certain amount of difference $\Delta Q_x$. However, this embodiment, instead of comparing the actual difference $\Delta Q$ with the criterion difference $\Delta Q_x$ gives the definition of the quick acceleration as that the engine speed is within a predetermined range and the throttle valve opening is larger than a predetermined value for the simple nature. More specifically, engine speeds is in the range within 1,000 rpm to 3,000 rpm and the throttle valve opening is larger than 5°. In one variation, engine speeds is in the same range and the throttle valve opening is larger than 20°. The first and more accurate definition is, of course, practicable by being provided with a sensor for measuring the actual air charge amount $Q_2$ and also a control routine in this ECU 71 or another device for calculating the difference $\Delta Q$ and comparing the difference with the criterion difference $\Delta Q_x$.

Returning to FIG. 6, if the state is not determined as the quick acceleration, the program returns to the step S1. Otherwise, the program goes to the step S3 to determine if it is the first combustion cycle by the sensed crankshaft angle. If this is positive, then the program goes to the step S4. In this step S4, the ECU 71 primarily increases the fuel amount to the amount F that is previously plotted in a control map. However, the ECU 71 reduces the amount $F_1$ ($F_1F_1<F$) and eventually adjusted the actual injected amount to be the amount Fa that is made by subtracting the amount $F_1$ from the amount F (Fa=F−$F_1$).

If the determination at the step S3 is negative, then the program goes to the step S5 to determine if it is the second combustion cycle. If this is positive, the program goes to the step S6 and, in the similarity to the step S4, the actual injected amount is adjusted to be the amount Fb (Fb =F−$F_2$). The amount $F_2$ is smaller than the amount $F_1$ ($F_2<F_1<F$).

If the determination at the step S5 is negative, then the program goes to step S7. In this step S7, the ECU 71 returns the injected amount to the primary amount F.

After the steps S4, S6 and S7, the program goes back to the step S1 during the engine operation and proceeds the acceleration control as long as the condition continues. With the end of the engine operation, the program goes to the end.

Amounts of the fuel are measured by duration of injection. Thus, the increase of the fuel amount means that the duration of injection is elongated, while the reduction of the fuel amount means that the duration of injection is shortened.

It should be noted that the steps S3 and S5 may determine other combustion cycles under the condition that the combustion cycle determined at the step S3 is earlier than the combustion cycle determined at the step S5 because engines operate in various and different situations. In addition, the reduction of the fuel in the first combustion cycle or cycles is allowed to be the total cut of the increase fuel amount, i.e., no increase of the fuel amount despite an acceleration condition starts.

As described above, since the fuel amounts injected in the transitional period Tr (FIG. 1) are adjusted to the amount that can match the actual air charge amount, the correct fuel air ratio is still kept in this period. Thus, the operator does not have uneasy feeling and the difficulty in control of emissions is removed.

Figure 7:
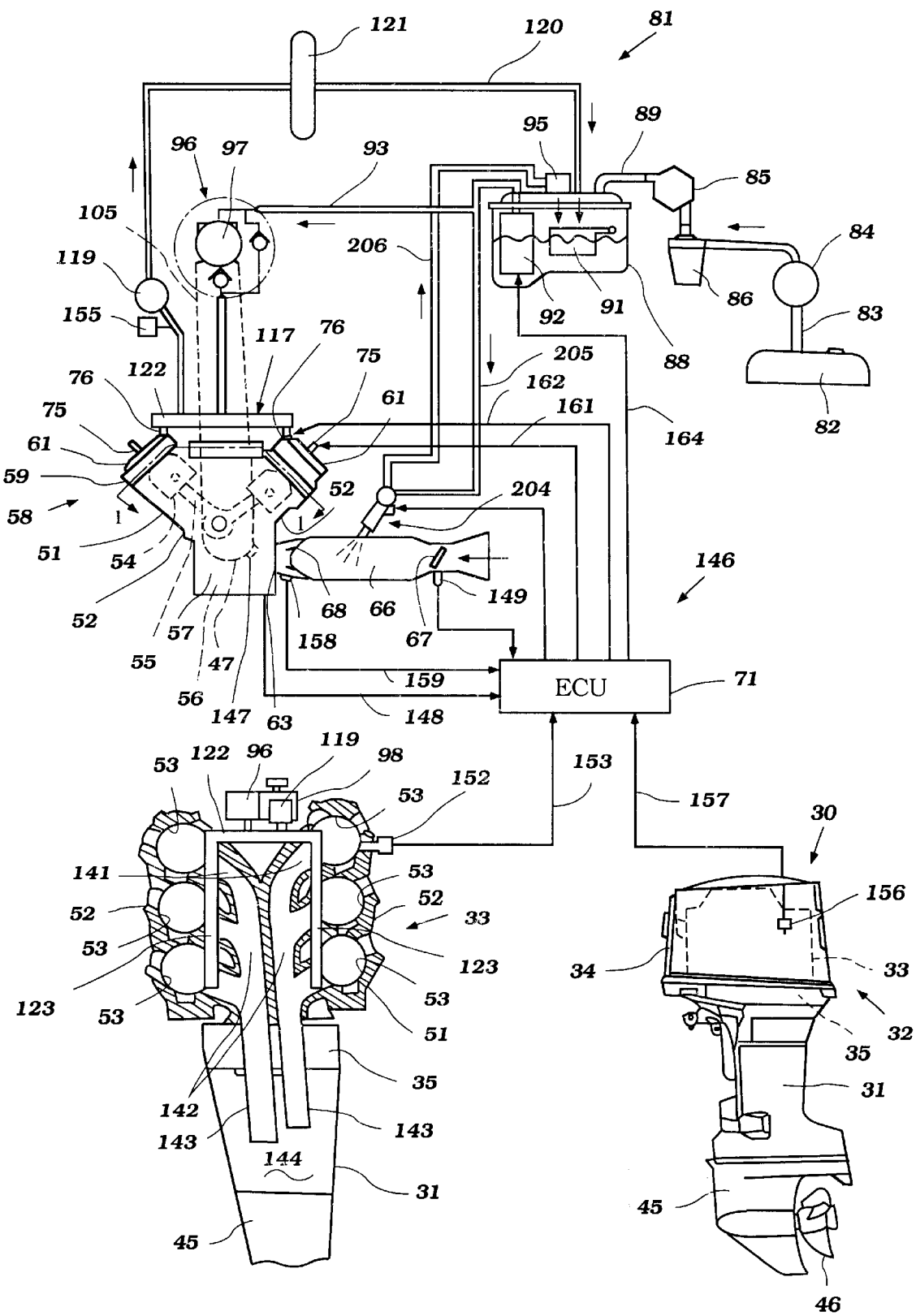
FIG. 7 is a multi-part view showing another outboard motor illustrated similarly as in FIG. 2. This outboard motor has an arrangement of the second embodiment of this invention.
Figure 8:
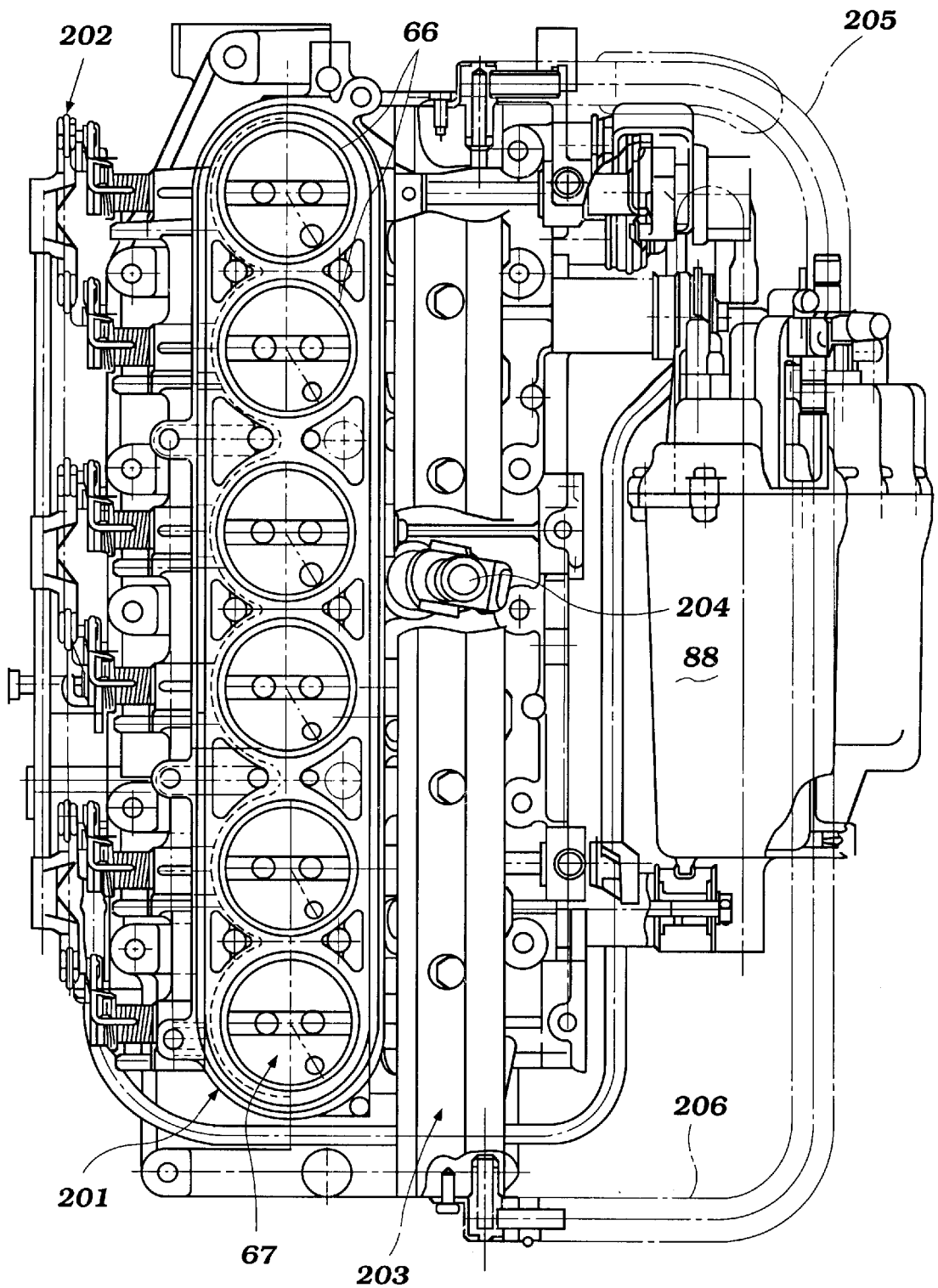
FIG. 8 is an elevational view showing the engine provided on the outboard motor shown in FIG. 7 and particularly a front part of an intake manifold.
Figure 9:
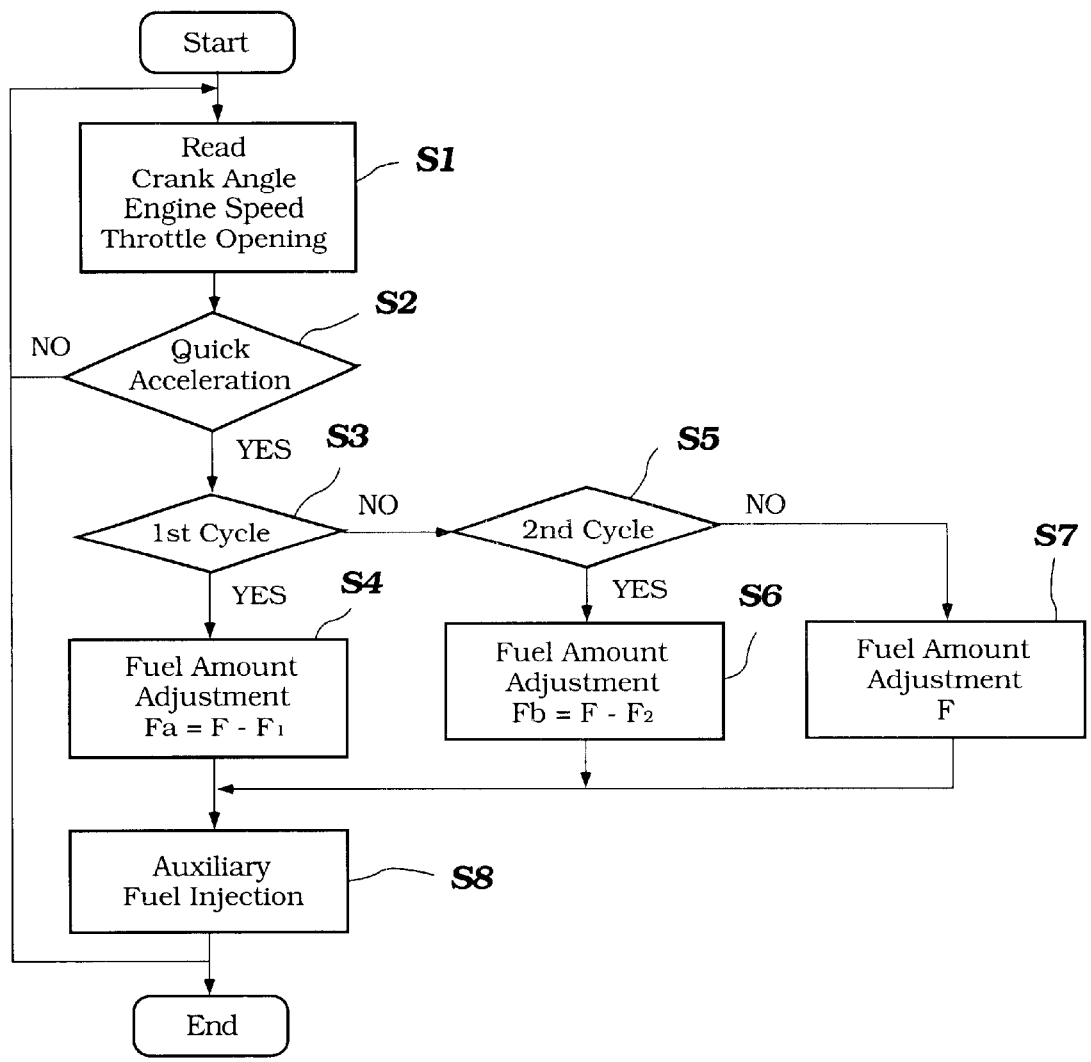
FIG. 9 is a schematic view showing how the ECU operates a control routine in accordance with another feature of the invention that is in connection with the second embodiment.

FIGS. 7, 8 and 9 show another arrangement and control wherein auxiliary fuel injection is further provided. Except for FIG. 8, the most part of these figures indicates the same components, members and steps disclosed in FIG. 2 and FIG. 6. Thus, no further descriptions on them are made by assigning the same reference numerals thereto so as to avoid redundancy. FIG. 8 illustrates an actual arrangement of a front part of an air intake manifold and the vapor separator 88 in this second embodiment.

An air intake manifold or induction device 201 that has six intake runners (throttle bodies) 66 is provided. The intake runners 66 accommodate throttle valves 67 therein that are simultaneously operated with a control link 202. An auxiliary fuel rail 203 is disposed vertically along the intake runners 66. Auxiliary fuel injectors 264 are held on the auxiliary fuel rail 203 so that each of them is placed at the respective intake runners 66. The top end of the fuel rail 203 is connected to the fuel supply line 93 via a conduit pipe 205, while the bottom end of the fuel rail 202 is connected to the low pressure regulator 95 via another conduit pipe 206.

The auxiliary fuel injectors 204 spray fuel into the intake runners 66 under the control of the ECU 71 as well as the cylinder fuel injectors 76. The fuel amount injected by the auxiliary fuel injectors 204 supplement a shortage of the fuel amount that is caused by the reduction of the fuel amount injected by the cylinder fuel injectors 76. As seen in FIG. 9, this injection is done in the step S8 that comes after the steps S4, S6 and S7. The fuel injected into the intake runners 66 by the auxiliary fuel injectors 204 has sufficient time for diffusion before entering into the combustion chambers. Because of this, the engine can be supplied sufficient amounts of fuel that is necessary under acceleration conditions. Thus, the uneasy feeling of the operator and the air fuel ratio can be further improved.

In addition, without using a large capacity pump which replaces the high pressure fuel pump 96, the auxiliary fuel injectors 204 can sufficiently supplement the shortage of the fuel amount required under a quick acceleration. Also, in case of malfunction of the high pressure pump 96 or when the fuel pressure goes down for some other reasons, the engine is allowed to continue its operation by injecting the fuel into the air induction device (intake runners) 66 with the auxiliary fuel injectors 204.

It should be noted that this invention is applicable in controlling fuel amounts under the conditions that the engine load is decreasing such as a deceleration condition.

It should be also noted that the features of this invention described above can be embodied in engines that operate on a four stroke principle. Also, these features are applicable not only to the outboard motors but also to other various engines such as marine engines except for the outboard motors, lawn mower engines and stationary engines.

Of course, the foregoing description is that of preferred embodiments of the invention, and various changes and modifications may be made without departing from the spirit and scope of the invention, as defined by the appended claims.

What is claimed is:

1. A direct cylinder injected, internal combustion engine comprising an engine body defining at least one cylinder bore in which a piston reciprocates to rotate a crankshaft, a cylinder head affixed to one end of said engine body for closing said cylinder bore and defining with said piston and said cylinder bore a combustion chamber, an air induction device having a throttle valve for admitting an air charge to said combustion chamber, a fuel injector for spraying fuel directly into said combustion chamber for combustion therein, means for sensing rotational speeds of said crankshaft, means for sensing an opening degree of said throttle valve, and a control device adapted to control an amount of fuel injected into the combustion chamber in response to an output from said throttle valve opening degree sensing means, and said control device delaying the adjustment control under a condition that an output from said crankshaft rotational speed sensing means is within a predetermined range and the output from said throttle valve opening degree sensing means is beyond a predetermined value.

2. A direct cylinder injected, internal combustion engine as set forth in claim 1, wherein the predetermined range comprises crankshaft rotational speeds above a predetermined value of the crankshaft rotational speed.

3. A direct cylinder injected, internal combustion engine as set forth in claim 1, wherein said control device gradually changes the fuel amount to the adjusted amount per combustion cycle.

4. A direct cylinder injected, internal combustion engine as set forth in claim 1, wherein said control device increases the fuel amount to the adjusted amount, and said control device does not increase the fuel amount at least at a first combustion cycle.

5. A direct cylinder injected, internal combustion engine as set forth in claim 1 further comprising an auxiliary fuel injector for spraying fuel into said air induction device.

6. A direct cylinder injected, internal combustion engine as set forth in claim 1 additionally comprising a fuel pump for supplying the fuel to said fuel injector under a fixed pressure, and the adjustment control is done by changing the duration of injection under the fixed pressure.

7. A direct cylinder injected, internal combustion engine as set forth in claim 1, wherein said crankshaft rotational speed sensing means is a crankshaft angle sensor.

8. A direct cylinder injected, internal combustion engine as set forth in claim 1, wherein said throttle valve opening degree sensing means is a throttle valve position sensor.

9. A direct cylinder injected, internal combustion engine as set forth in claim 1 wherein said engine operates on a two stroke crankcase compression principle.

10. A direct cylinder injected, internal combustion engine as set forth in claim 1 wherein said engine powers a marine propulsion device.

11. A direct cylinder injected, internal combustion engine comprising an engine body defining at least one cylinder bore in which a piston reciprocates, a cylinder head affixed to one end of said engine body for closing said cylinder bore and defining with said piston and said cylinder bore a combustion chamber, an air induction device for admitting an air charge to said combustion chamber, a fuel injector for spraying fuel directly into said combustion chamber for combustion therein, means for sensing amounts of the air charge demanded by said engine, means for sensing engine speed, and means for controlling an amount of the fuel delivered by the fuel injector, said fuel amount control means being adapted to increase the fuel amount to a primary amount in response to the output of said air charge amount sensing means when the demanded air charge amount increases, and said fuel amount control means further adapted to direct the fuel injector to deliver a reduced amount that is less than the primary amount and to increase the reduced amount to the primary amount step by step per combustion cycle when an output from the engine speed sensing means is within a predetermined range and the demanded air charge amount is beyond a predetermined amount, wherein the demanded air charge amount cannot be delivered to said combustion chamber.

12. A direct cylinder injected, internal combustion engine as set forth in claim 11, wherein said fuel amount control means do not increase the fuel amount at least at a first combustion cycle.

13. A direct cylinder injected, internal combustion engine as set forth in claim 11 further comprising an auxiliary fuel injector for spraying fuel into said induction devices.

14. A direct cylinder injected, internal combustion engine as set forth in claim 11 additionally comprising a throttle valve located in said induction device, wherein said air charge amount sensing means sense an opening position of said throttle valve.

15. A method of operating a direct cylinder injected, internal combustion engine having a crankshaft, a throttle valve for admitting an air charge to a combustion chamber, a fuel injector for spraying fuel directly into said combustion chamber, at least one sensor, and a control device, said method comprising sensing an opening degree of said throttle valve, increasing an amount of the fuel to a primary amount when the opening degree increases, sensing a rotational speed of said crankshaft, directing the fuel injector to spray a reduced amount of the fuel that is less than the primary amount and then to increase the reduced amount to the primary amount step by step per combustion cycle when the rotational speed of said crankshaft is within a predetermined range and the opening degree of the throttle valve is larger than a predetermined value.

16. A method of operating a direct cylinder injected, internal combustion engine as set forth in claim 15, additionally having a second fuel injector for spraying fuel upstream of the combustion chamber, wherein the method further comprising increasing an amount of fuel by said second fuel injector in addition to the fuel amount sprayed by the first fuel injector when the opening degree of the throttle valve increases.

17. A method of operating a direct cylinder injected, internal combustion engine as set forth in claim 15 wherein said engine operates on a two stroke crankcase compression principle.

18. A direct cylinder injected, internal combustion engine as set forth in claim 1, wherein the control device increases the amount of the fuel when the output from the opening degree sensing means increases, and said control device delays the increase control under a condition that the output from said crankshaft rotational speed sensing means is within a predetermined range and the output from the opening degree sensing means is greater than the predetermined value.

19. A direct cylinder injected, internal combustion engine as set forth in claim 3, wherein said control device changes the fuel amount to the adjusted amount step by step per combustion cycle.

20. A direct cylinder injected, internal combustion engine as set forth in claim 19, wherein the number of the combustion cycle is preset in the control device.

21. A direct cylinder injected, internal combustion engine as set forth in claim 11, wherein the number of the combustion cycle is preset in the fuel amount control means.

22. A direct cylinder injected, internal combustion engine as set fourth in claim 11, wherein the primary amount is preset in the fuel amount control means.

23. A direct cylinder injected, internal combustion engine comprising an engine body defining at least one cylinder bore in which a piston reciprocates, a cylinder head closing the cylinder bore and defining a combustion chamber together with the cylinder bore and the piston, an air induction device arranged to introduce air to the combustion chamber, the air induction device having a throttle valve for measuring an amount of the air, a fuel injector arranged to spray fuel directly into the combustion chamber, a first sensor arranged to sense an engine speed, a second sensor arranged to sense an opening degree of the throttle valve, and a controller for controlling an amount of the fuel sprayed by the fuel injector based upon a signal of the second sensor, the controller adapted to increase the amount of the fuel sprayed by the fuel injector to a primary amount when the second sensor signal indicates that the opening degree increases, and the control device further adapted to delay the increase in fuel amount under a condition that the first sensor senses that the engine speed is within a predetermined range and the second sensor signal indicates that the opening degree is greater than a predetermined degree.

24. A direct cylinder injected, internal combustion engine as set forth in claim 23, wherein the controller is adapted to gradually increase the fuel amount to the primary amount per combustion cycle.

25. A direct cylinder injected, internal combustion engine as set forth in claim 24, wherein the number of the combustion cycle is preset in the controller.

26. A direct cylinder injected, internal combustion engine as set forth in claim 24, wherein the primary amount is preset in the controller.

27. An internal combustion engine comprising an engine body, a first member moveable relative to the engine body, the engine body and the first member together defining a combustion chamber, a second member coupled with the first member to rotate with the movement of the first member, an air induction system arranged to introduce air to the combustion chamber, the air induction system including a throttle valve configured to change an amount of the air in accordance with a demand of an operator of the engine, a fuel injector arranged to spray fuel directly into the combustion chamber, a first sensor arranged to sense a rotation of the second member, a second sensor arranged to sense a rotational speed of the second member, a third sensor arranged to sense an opening degree of the throttle valve, and a control system configured to increase the fuel amount to a primary amount when the signal from the third sensor indicates that the opening degree increases, the control system further configured to control the fuel injector to spray a reduced amount that is less than the primary amount and to increase the reduced amount to the primary amount gradually per a rotation of the second member sensed by the first sensor under a condition that the signal from the second sensor indicates that the rotational speed of the second member is within a predetermined range and the signal from the third sensor indicates that the opening degree of the throttle valve is greater than a predetermined value.

28. An internal combustion engine as set forth in claim 27, wherein a common sensor element acts as the first and second sensors.

29. An internal combustion engine as set forth in claim 27 wherein the control system increases the reduced amount to the primary amount step by step per rotation of the second member.

30. A direct cylinder injected, internal combustion engine as set forth in claim 29, wherein the number of the rotation is preset in the control system.

31. A direct cylinder injected, internal combustion engine as set forth in claim 27, wherein the primary amount is preset in the control system.

32. An internal combustion engine as set forth in claim 27 additionally comprising a second fuel injector arranged to spray fuel upstream of the combustion chamber, wherein the control system increases the fuel amount by using the second fuel injector in addition to the first injector.

33. A method of operating a direct cylinder injected, internal combustion engine having a crankshaft, a throttle valve for admitting an air charge to a combustion chamber, a fuel injector for delivering fuel directly into the combustion chamber, and a controller, comprising detecting a throttle valve opening angle, determining whether the throttle valve opening angle is greater than a predetermined value, determining an amount of fuel to be delivered by the fuel injector, the amount of fuel corresponding to the throttle valve angle, detecting a crankshaft rotation speed, determining whether the crankshaft rotation speed is within a predetermined range, and reducing the amount of fuel if the crankshaft rotation speed is within the predetermined range and the throttle valve opening angle is greater than a predetermined value.

34. A method in accordance with claim 33, wherein quick acceleration is detected if the crankshaft rotation speed is within the predetermined range and the throttle valve opening angle is greater than a predetermined value, and additionally comprising the steps of counting first and second crankshaft rotations after quick acceleration is detected, and reducing the amount of fuel during the second crankshaft rotation by an amount less than the amount of fuel was reduced during the first crankshaft rotation.

35. A method in accordance with claim 33, wherein the reduced amount of fuel to be delivered by the fuel injectors is adapted to mix with air within the combustion chamber to maintain an advantageous air/fuel mixture for combustion.

36. A method in accordance with claim 33, wherein the predetermined range is about 1,000–3,000 revolutions per minute.

37. A method in accordance with claim 36, wherein the predetermined value is about 5°.

38. A method in accordance with claim 36, wherein the predetermined value is about 20°.

* * * * *

UNITED STATES PATENT AND TRADEMARK OFFICE
CERTIFICATE OF CORRECTION

PATENT NO. : 6,354,277 B1 Page 1 of 1
DATED : March 12, 2002
INVENTOR(S) : Kato, Masahiko It is certified that error appears in the above-identified patent and that said Letters Patent is hereby corrected as shown below:

<u>Column 13,</u>
Line 26, please change "devices", to -- device --

Signed and Sealed this

First Day of June, 2004

JON W. DUDAS
*Acting Director of the United States Patent and Trademark Office*